(12) United States Patent
Jung et al.

(10) Patent No.: US 9,519,173 B2
(45) Date of Patent: Dec. 13, 2016

(54) DISPLAY PANEL INCLUDING A TRENCH DEFINED IN A SUBSTRATE

(75) Inventors: Yang-Ho Jung, Seoul (KR); Seung-Bo Shim, Asan-si (KR); Jin-Ho Ju, Seoul (KR); Jun-Gi Kim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 80 days.

(21) Appl. No.: 13/604,242

(22) Filed: Sep. 5, 2012

(65) Prior Publication Data

US 2013/0248868 A1 Sep. 26, 2013

(30) Foreign Application Priority Data

Mar. 21, 2012 (KR) .................. 10-2012-0028557

(51) Int. Cl.
| | |
|---|---|
| G02F 1/1333 | (2006.01) |
| G02F 1/1337 | (2006.01) |
| G02F 1/1341 | (2006.01) |
| G02F 1/1343 | (2006.01) |
| G02F 1/1362 | (2006.01) |
| G02F 1/1368 | (2006.01) |

(52) U.S. Cl.
CPC ....... *G02F 1/133377* (2013.01); *G02F 1/1337* (2013.01); *G02F 1/1341* (2013.01); *G02F 2001/13685* (2013.01); *G02F 2001/134318* (2013.01); *G02F 2001/136222* (2013.01)

(58) Field of Classification Search
CPC .............. G02F 1/133377; G02F 2001/133757; G02F 2001/136222
USPC ................. 349/153, 154, 158, 160, 189, 156
See application file for complete search history.

(56) References Cited

U.S. PATENT DOCUMENTS

| | | | | |
|---|---|---|---|---|
| 5,473,450 A | * | 12/1995 | Yamada | G02F 1/133377 349/84 |
| 5,668,617 A | * | 9/1997 | Na | 349/156 |
| 6,358,856 B1 | | 3/2002 | Lyons et al. | |
| 7,808,609 B2 | * | 10/2010 | Kim et al. | 349/192 |
| 8,908,127 B2 | * | 12/2014 | Jin | G02F 1/133377 349/86 |
| 2006/0146250 A1 | * | 7/2006 | Wu et al. | 349/141 |
| 2007/0071909 A1 | * | 3/2007 | Eun et al. | 428/1.1 |
| 2007/0109471 A1 | * | 5/2007 | Ting et al. | 349/113 |
| 2007/0243332 A1 | * | 10/2007 | Zang et al. | 427/393.5 |
| 2008/0036960 A1 | * | 2/2008 | Ding | G02F 1/133377 349/156 |

(Continued)

FOREIGN PATENT DOCUMENTS

| | | |
|---|---|---|
| KR | 1020050002368 A | 1/2005 |
| KR | 1020100136678 A | 12/2010 |

*Primary Examiner* — Tucker J Wright
*Assistant Examiner* — Mark Hatzilambrou
(74) *Attorney, Agent, or Firm* — Cantor Colburn LLP

(57) ABSTRACT

A display panel includes a base substrate, a common electrode, a liquid crystal layer, a pixel electrode, a gate line, a data line, a switching element, a color filter and a light blocking pattern. The base substrate includes a trench. The common electrode is disposed in the trench. The liquid crystal layer is disposed in the trench and disposed on the common electrode. The pixel electrode is disposed on the base substrate and the liquid crystal layer. The gate line, the data line and the switching element are disposed on the base substrate and the pixel electrode. The color filter and the light blocking pattern are disposed on the gate line, the data line and the switching element.

8 Claims, 21 Drawing Sheets

(56) References Cited

U.S. PATENT DOCUMENTS

2008/0084527 A1\* 4/2008 Yanagawa et al. ........... 349/123
2012/0019763 A1\* 1/2012 Kang et al. ................... 349/153

\* cited by examiner

DISPLAY PANEL INCLUDING A TRENCH DEFINED IN A SUBSTRATE

This application claims priority to Korean Patent Application No. 10-2012-0028557, filed on Mar. 21, 2012, and all the benefits accruing therefrom under 35 U.S.C. §119, the contents of which in its entirety are herein incorporated by reference.

BACKGROUND

1. Field

Exemplary embodiments of the invention relate to a display panel and a method of manufacturing the display panel. More particularly, exemplary embodiments of the invention relate to a display panel decreasing a manufacturing cost and improving a durability thereof and a method of manufacturing the display panel.

2. Description of the Related Art

Generally, a display panel includes an array substrate including a switching element, a color filter substrate facing the array substrate and including a color filter and a liquid crystal layer disposed between the array substrate and the color filter substrate. The array substrate includes a first base substrate. The color filter substrate includes a second base substrate. The display panel includes two base substrates so that a manufacturing cost of the display panel may increase.

SUMMARY

Exemplary embodiments of the invention provide a display panel capable of decreasing a manufacturing cost and improving a durability thereof.

Exemplary embodiments of the invention also provide a method of manufacturing the display panel.

In an exemplary embodiment of a display panel according to the invention, the display panel includes a base substrate, a common electrode, a liquid crystal layer, a pixel electrode, a gate line, a data line, a switching element, a color filter and a light blocking pattern. The base substrate includes a trench. The common electrode is disposed in the trench. The liquid crystal layer is disposed in the trench and disposed on the common electrode. The pixel electrode is disposed on the base substrate and the liquid crystal layer. The gate line, the data line and the switching element are disposed on the base substrate and the pixel electrode. The color filter and the light blocking pattern are disposed on the gate line, the data line and the switching element.

In an exemplary embodiment, the display panel may further include a first passivation layer disposed between the liquid crystal layer and the pixel electrode, a second passivation layer disposed between the pixel electrode and the switching element and a third passivation layer disposed between the switching element and the light blocking pattern.

In an exemplary embodiment, the switching element may include a gate electrode disposed on the second passivation layer, a gate insulating layer disposed on the gate electrode, a semiconductor layer disposed on the gate insulating layer and overlapping the gate electrode, a source electrode disposed on the semiconductor layer and overlapping the semiconductor layer, and a drain electrode disposed on the semiconductor layer, overlapping the semiconductor layer and spaced apart from the source electrode.

In an exemplary embodiment, the second passivation layer and the gate insulating layer may include a contact hole, and the drain electrode may be connected to the pixel electrode through the contact hole.

In an exemplary embodiment, the display panel may include a display area corresponding to the color filter and a peripheral area corresponding to the light blocking pattern, and an injection hole in the peripheral area, extending from an outside of the trench to an inside of the trench, and through which the liquid crystal layer is provided to the trench.

In an exemplary embodiment, the display panel may further include a hole light blocking pattern disposed in the trench corresponding to the injection hole.

In an exemplary embodiment, the display panel may further include a planarizing layer disposed on the color filter and the light blocking pattern, the planarizing layer compensating a height difference between the color filter and the light blocking pattern.

In an exemplary embodiment, the display panel may further include a first polarizing plate disposed under the base substrate and a second polarizing plate disposed on the planarizing layer.

In another exemplary embodiment of a display panel according to the invention, the display panel includes a base substrate, a protecting layer, a common electrode, a liquid crystal layer, a pixel electrode, a gate line, a data line, a switching element, a color filter and a light blocking pattern. The protecting layer includes a trench. The common electrode is disposed in the trench. The liquid crystal layer is disposed in the trench and disposed on the common electrode. The pixel electrode is disposed on the protecting layer and the liquid crystal layer. The gate line, the data line and the switching element are disposed on the protecting layer and the pixel electrode. The color filter and the light blocking pattern are disposed on the gate line, the data line and the switching element.

In an exemplary embodiment of a method of manufacturing a display panel according to the invention, the method includes providing a trench in a base substrate, providing a common electrode in the trench, providing a sacrifice layer in the trench, providing a pixel electrode on the base substrate, providing a gate line, a data line and a switching element on the base substrate and the pixel electrode, providing a color filter and a light blocking pattern on the gate line, the data line and the switching element, providing an injection hole extending from an outside of the trench to an inside of the trench, removing the sacrifice layer through the injection hole and providing a liquid crystal layer in the trench through the injection hole.

In an exemplary embodiment, the method may further include providing a first passivation layer between the sacrifice layer and the pixel electrode, providing a second passivation layer between the pixel electrode and the switching element and providing a third passivation layer between the switching element and the light blocking pattern.

In an exemplary embodiment, the providing the switching element may include providing a gate electrode on the second passivation layer, providing a gate insulating layer on the gate electrode, providing a semiconductor layer on the gate insulating layer, the semiconductor layer overlapping the gate electrode, providing a contact hole at the second passivation layer and the gate insulating layer, providing a source electrode on the semiconductor layer, the source electrode overlapping the semiconductor layer and providing a drain electrode on the semiconductor layer, the drain electrode overlapping the semiconductor layer and spaced apart from the source electrode.

In an exemplary embodiment, the injection hole may be formed when the gate electrode is formed.

In an exemplary embodiment, the display panel may include a display area corresponding to the color filter and a peripheral area corresponding to the light blocking pattern. The injection hole may be formed in the peripheral area.

In an exemplary embodiment, the method may further include providing a hole light blocking pattern in the trench corresponding to the injection hole.

In an exemplary embodiment, the method may further include a planarizing layer on the color filter and the light blocking pattern, the planarizing layer compensating a height difference between the color filter and the light blocking pattern.

In an exemplary embodiment, the method may further include providing a first polarizing plate under the base substrate and providing a second polarizing plate on the planarizing layer.

In an exemplary embodiment, the injection hole may be formed when the pixel electrode is formed.

In an exemplary embodiment, the providing the common electrode may include providing a common electrode material on the base substrate and on a trench mask having a shape corresponding to the trench, and removing the trench mask and the common electrode material deposited on the trench mask.

In an exemplary embodiment, the sacrifice layer may include a photo resist material. The sacrifice layer may be removed using a strip solution.

In another exemplary embodiment of a method of manufacturing a display panel according to the invention, the method includes providing a protecting layer on a base substrate, providing a trench in the protecting layer, providing a common electrode in the trench, providing a sacrifice layer in the trench, providing a pixel electrode on the protecting layer, providing a gate line, a data line and a switching element on the protecting layer and the pixel electrode, providing a color filter and a light blocking pattern on the gate line, the data line and the switching element, providing an injection hole extending from an outside of the trench to an inside of the trench, removing the sacrifice layer through the injection hole and providing a liquid crystal layer in the trench through the injection hole.

According to one or more embodiment of the display panel and the method of manufacturing the display panel, the display panel includes a single base substrate so that a manufacturing cost may decrease. The liquid crystal layer is provided in the trench of the base substrate or in the trench of the protecting layer so that a durability of the display panel may be improved.

BRIEF DESCRIPTION OF THE DRAWINGS

The above and other features and advantages of the invention will become more apparent by describing in detailed exemplary embodiments thereof with reference to the accompanying drawings, in which.

DETAILED DESCRIPTION

Figure 1:
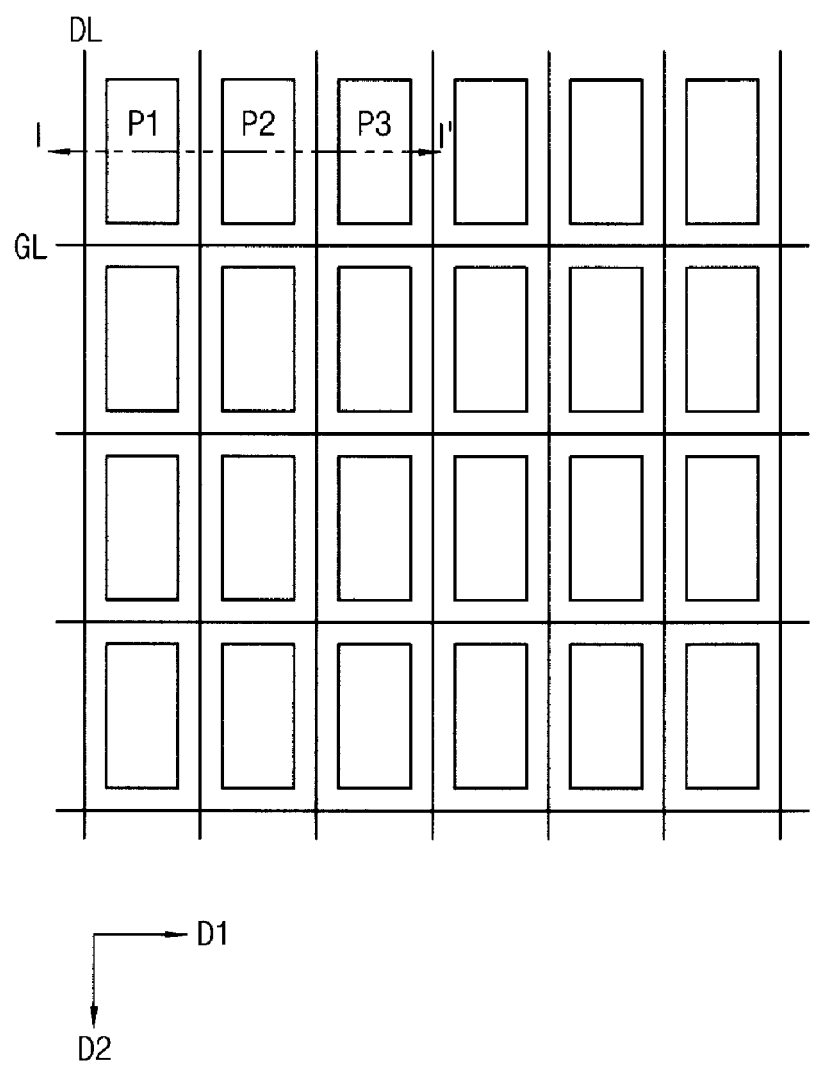
FIG. 1 is a plan view illustrating an exemplary embodiment of a display panel according to the invention.

It will be understood that when an element or layer is referred to as being "on," "connected to" or "coupled to" another element or layer, the element or layer can be directly on, connected or coupled to another element or layer or intervening elements or layers. In contrast, when an element is referred to as being "directly on," "directly connected to" or "directly coupled to" another element or layer, there are no intervening elements or layers present. As used herein, connected may refer to elements being physically and/or electrically connected to each other. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" or "under" relative to other elements or features would then be oriented "above" relative to the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

A display panel of an embedded microcavity type has been developed. The display panel of the embedded microcavity type includes a single base substrate having a switching element and a color filter, and an embedded microcavity receiving liquid crystal molecules.

However, the embedded microcavity may not be rigidly or stably formed due to limitations of manufacturing conditions, such as achieving a specific and/or uniform thickness and employing a specific and/or uniform deposition temperature. Thus, the embedded microcavity may undesirably lift off the formed structure or may undesirably collapse due to a physical pressure.

When the display panel of the embedded microcavity type is applied to a touch display apparatus, since the embedded microcavity may lift off or collapse, the embedded microcavity may be more easily damaged.

Hereinafter, exemplary embodiments of the invention will be described in further detail with reference to the accompanying drawings.

FIG. 1 is a plan view illustrating an exemplary embodiment of a display panel according to the invention.

Referring to FIG. 1, the display panel includes a gate line GL, a data line DL and a pixel. The display panel may include a plurality of gate lines GL, a plurality of data lines DL and a plurality of pixels.

The longitudinal axis of the gate line GL may extend in a first direction D1 and the longitudinal axis of the data line DL may extend in a second direction D2 crossing the first direction D1. Alternatively, the longitudinal axis of the gate line GL may extend in the second direction D2 and the longitudinal axis of the data line DL may extend in the first direction D1.

The pixels may be disposed in a matrix form in the plan view. In one exemplary embodiment, the pixels may be disposed in areas defined by the gate lines GL and the data lines DL, but the invention is not limited thereto or thereby.

The pixel may be connected to the gate line GL and the data line DL. In one exemplary embodiment, for example, the pixel may be connected to one gate line GL adjacent to the pixel and one data line DL adjacent to the pixel, but the invention is not limited thereto or thereby.

The pixel may have a rectangular shape in the plan view. In one exemplary embodiment, for example, the pixel may have a rectangular shape having a longer side extending in the second direction D2.

Each pixel may represent a color. In one exemplary embodiment, for example, a first pixel P1 may represent red. A second pixel P2 adjacent to the first pixel P1 in the first direction D1 may represent green. A third pixel P3 adjacent to the second pixel P2 in the first direction D1 may represent blue.

The pixel includes a common electrode, a pixel electrode, and a liquid crystal layer disposed between the common electrode and the pixel electrode. An arrangement of liquid crystal molecules in the liquid crystal layer is adjusted by an electric field applied by the pixel electrode and the common electrode so that a light transmittance of the liquid crystal layer is adjusted.

The pixel further includes a switching element connected to the pixel electrode, and a color filter representing a color of the pixel. In one exemplary embodiment, for example, the switching element may be a thin film transistor ("TFT"). The switching element may be connected to an adjacent gate line GL and an adjacent data line DL. The switching element may be disposed where the gate line GL and the data line DL cross each other, but the invention is not limited thereto or thereby.

A structure of the pixel may be explained in detail referring to FIGS. 2 to 5.

Figure 2:
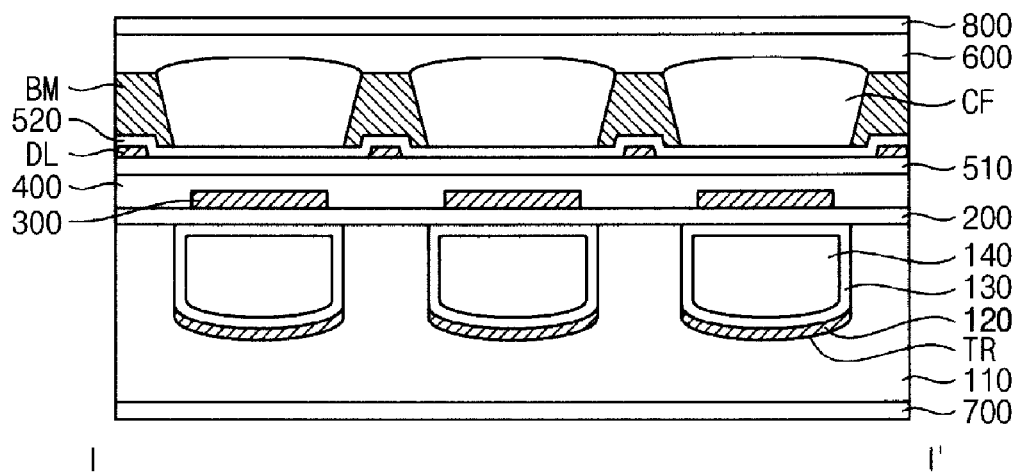
FIG. 2 is a cross-sectional view of the display panel taken along line I-I' of FIG. 1.

FIG. 2 is a cross-sectional view of the display panel taken along line I-I' of FIG. 1.

Referring to FIGS. 1 and 2, the display panel includes a base substrate 110, a common electrode 120, a liquid crystal layer 140, a first passivation layer 200, a pixel electrode 300, a second passivation layer 400, a gate line GL, a data line DL, a switching element, a third passivation layer 520, a color filter CF and a light blocking pattern BM. The display panel may include only one substrate, that is, the base substrate 110, but the invention is not limited thereto or thereby.

The display panel may further include an alignment layer 130 which aligns the liquid crystal layer 140. The display panel may further include a planarizing layer 600 which planarizes the color filter CF and the light blocking pattern BM. The display panel may further include a first polarizing plate 700 disposed under the base substrate 110, and a second polarizing plate 800 disposed on the planarizing layer 600. When the planarizing layer 600 is omitted, the second polarizing plate 800 may be disposed on the color filter CF and the light blocking pattern BM.

The base substrate 110 includes a glass. The base substrate 110 may include a flexible material. The base substrate 110 may include a plastic. A trench TR is in the base substrate 110. The trench TR may extend from an upper surface of the base substrate 110 and to an inner area of the substrate 110. The trench TR may substantially correspond to a pixel area. As used herein, "corresponding" may mean substantially similar in dimension and/or location with respect to another element or feature.

The common electrode 120 is disposed in the trench TR and on a bottom portion of the trench TR. A common voltage is applied to the common electrode 120. In one exemplary embodiment, for example, the common electrode 120 may include a transparent conductive material such as an indium tin oxide ("ITO"), an indium zinc oxide ("IZO") and an aluminum doped zinc oxide ("AZO").

The alignment layer 130 may be disposed on an upper surface of the common electrode 120 and on inner walls of the trench TR. The alignment layer 130 may define an opened area in the trench TR in which a material is disposed, such as liquid crystal material of the liquid crystal layer 140. The alignment layer 130 aligns liquid crystal molecules in the liquid crystal layer 140. In a method of forming the display panel, the alignment layer 130 may be injected into the trench TR through an injection hole. The injection hole is explained in detail referring to FIGS. 3 and 4.

The liquid crystal layer 140 is in the trench TR. The trench TR is filled with the liquid crystal layer 140, such as completely filling the opened area defined by the alignment layer 130. In one exemplary embodiment, the liquid crystal layer 140 may be injected into the trench TR through the injection hole.

The first passivation layer 200 is disposed on the base substrate 110 and the liquid crystal layer 140. The first passivation layer 200 is disposed between the liquid crystal layer 140 and the pixel electrode 300. The first passivation layer 200 may be disposed corresponding to an entire planar area of the base substrate 110. The first passivation layer 200 may include an insulating material. In one exemplary embodiment, for example, the first passivation layer 200 may include a silicon nitride (SiNx). In another exemplary embodiment, the first passivation layer 200 may include a silicon oxide (SiOx).

The pixel electrode 300 is disposed on the first passivation layer 200. The pixel electrode 300 may be disposed in the pixel area. A gray voltage is applied to the pixel electrode 300 through the switching element. In one exemplary embodiment, for example, the pixel electrode 300 may include the transparent conductive material such as an indium tin oxide ("ITO"), an indium zinc oxide ("IZO") and an aluminum doped zinc oxide ("AZO"). In one exemplary embodiment, for example, the pixel electrode 300 may have a slit pattern.

The second passivation layer 400 is disposed on the first passivation layer 200 and the pixel electrode 300. The second passivation layer 400 is disposed between the pixel electrode 300 and the switching element. The second passivation layer 400 may planarize the pattered pixel electrode 300. The second passivation layer 400 may be disposed corresponding to the entire planar area of the base substrate 110. The second passivation layer 400 may include an insulating material. In one exemplary embodiment, for example, the second passivation layer 400 may include the silicon nitride (SiNx). The second passivation layer 400 may include the silicon oxide (SiOx).

The gate line GL, the data line DL and the switching element are disposed on the second passivation layer 400. The switching element includes a gate electrode, a gate insulating layer 510, a semiconductor layer, a source electrode and a drain electrode. A structure of the switching element is explained in detail referring to FIG. 5.

The third passivation layer 520 is disposed on the gate line GL, the data line DL and the switching element. The third passivation layer 520 is disposed between the switching element and the light blocking pattern BM. The third passivation layer 520 may be disposed corresponding to the entire planar area of the base substrate 110. The third passivation layer 520 may include an insulating material. In one exemplary embodiment, for example, the third passivation layer 520 may include the silicon nitride (SiNx). The third passivation layer 520 may include the silicon oxide (SiOx).

The color filter CF and the light blocking pattern BM are disposed on the third passivation layer 520. The color filter CF defines a display area of the display panel. The light blocking pattern BM defines a peripheral area of the display panel. A light passing through the color filter CF has a color according to a color of the color filter CF. The color filter CF may be one of a red color filter, a green color filter and a blue color filter, but the invention is not limited thereto or thereby. The light blocking pattern BM may be disposed corresponding to areas at which the gate line GL, the data line DL and the switching element are disposed.

The planarizing layer 600 may be disposed on the color filter CF and the light blocking pattern BM. The planarizing layer 600 may compensate a height difference between the color filter CF and the light blocking pattern BM. In an alternative exemplary embodiment, the planarizing layer 600 may be omitted.

The first polarizing plate 700 may be disposed under the base substrate 110. In one exemplary embodiment, for example, the first polarizing plate 700 may adhere to a lower surface of the base substrate 110. The first polarizing plate 700 may polarize light provided from a backlight assembly (not shown). The first polarizing plate 700 may have a first polarizing axis. The first polarizing plate 700 passes light having a direction of the first polarizing axis among the light having various directions provided from the backlight assembly.

The second polarizing plate 800 may be disposed on the planarizing layer 600. In one exemplary embodiment, for example, the second polarizing plate 800 may adhere to an upper surface of the planarizing layer 600. When the planarizing layer 600 is omitted, the second polarizing plate 800 may alternatively be disposed on the color filter CF and the light blocking pattern BM. The second polarizing plate 800 may polarize light passing through the color filter CF. The second polarizing plate 800 may have a second polarizing axis. The second polarizing axis may be substantially perpendicular to the first polarizing axis. The second polarizing plate 800 passes light having a direction of the second polarizing axis among the light having various directions passing through the color filter CF.

Figure 3:
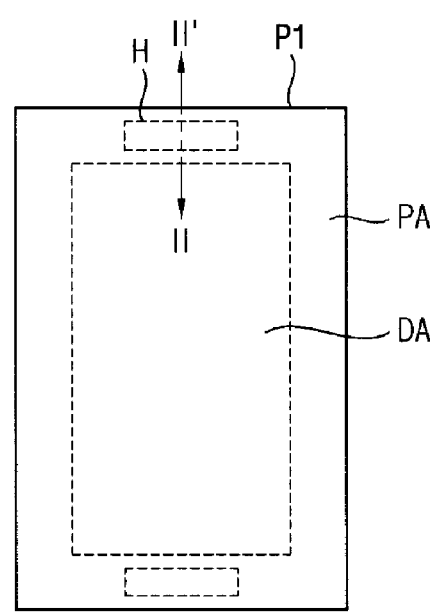
FIG. 3 is a plan view illustrating an exemplary embodiment of a first pixel of FIG. 1.
Figure 4:
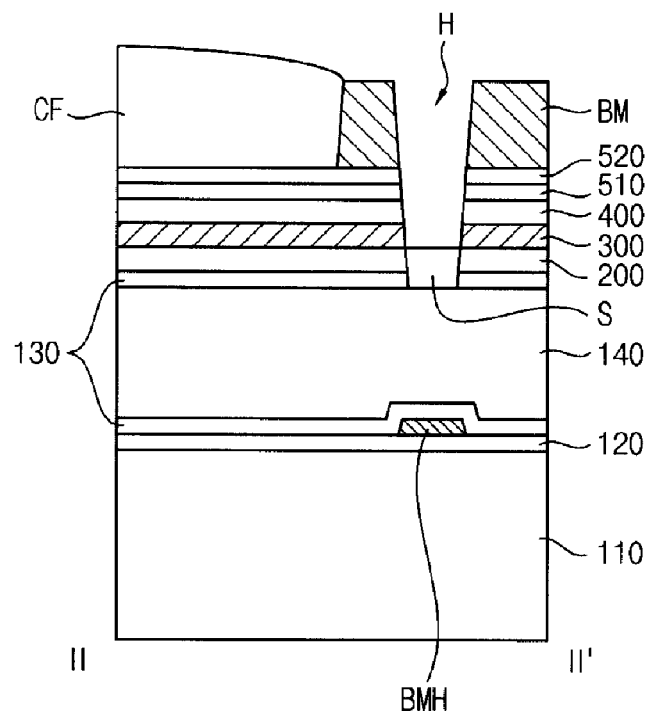
FIG. 4 is a cross-sectional view of the first pixel of the display panel taken along line II-II' of FIG. 3.

FIG. 3 is a plan view illustrating the first pixel P1 of FIG. 1. FIG. 4 is a cross-sectional view of the first pixel of the display panel taken along line II-II' of FIG. 3.

Referring to FIGS. 1 to 4, the first pixel P1 has a display area DA and a peripheral area PA. The peripheral area PA surrounds the display area DA and may exclude the display area DA. The display area DA corresponds to the color filter CF. The peripheral area PA corresponds to the light blocking pattern BM.

The first pixel P1 includes an injection hole H. The injection hole H may be in the peripheral area PA. The injection hole H extends from an outside of the trench TR to an inside of the trench TR. As shown in FIG. 3, the injection holes H may be disposed at a first end portion of the first pixel P1 adjacent to a first side of the first pixel P1 and at a second end portion of the first pixel P1 adjacent to a second side of the first pixel P1 opposite to the first side. Alternatively, the injection hole may be disposed at only one of the first end portion and the second end portion. Alternatively, the injection holes may be disposed at the first end portion, the second end portion, a third end portion of the first pixel P1 adjacent to a third side of the first pixel P1 adjacent to the first side, and a fourth end portion of the first pixel P1 adjacent to a fourth side of the first pixel P1 opposite to the third side.

The injection hole H may be disposed adjacent to the gate line GL. Alternatively, the injection hole H may be disposed adjacent to the data line DL.

In an exemplary embodiment of forming a display panel, the alignment layer 130 is injected into the trench TR through the injection hole H. The liquid crystal layer 140 is injected into the trench TR through the injection hole H. The injection hole H may be sealed using a sealant S after the liquid crystal layer 140 is injected into the trench TR.

The light blocking pattern BM includes a hole or opened area, at the injection hole H. A hole light blocking pattern BMH is disposed in the trench TR corresponding to the injection hole H. The hole light blocking pattern BMH may be disposed on the common electrode 120. The hole light blocking pattern BMH prevents light leakage at the hole of the light blocking pattern BM corresponding to the injection hole H. Although the hole light blocking pattern BMH is disposed on the common electrode 120 in FIG. 4, the hole light blocking pattern BMH may be disposed on the base substrate 110 and the common electrode 120 may be disposed on the hole light blocking pattern BMH, such that the hole light blocking pattern BMH is between the common electrode 120 and the base substrate 110.

Figure 5:
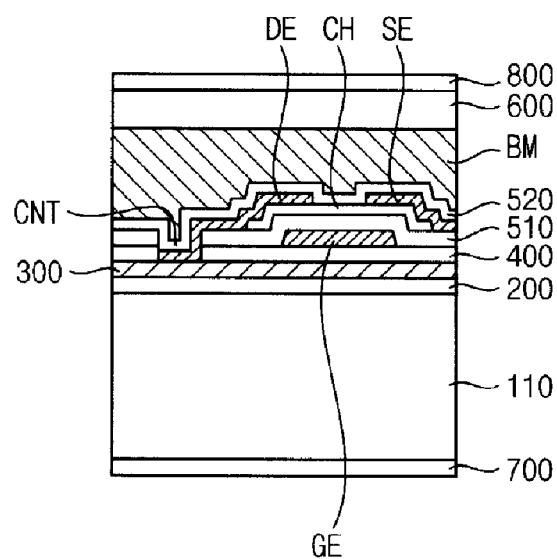
FIG. 5 is a cross-sectional view of an exemplary embodiment of an area of the display panel including a switching element.

FIG. 5 is a cross-sectional view of an exemplary embodiment of an area of the display panel including a switching element.

Referring to FIG. 5, the first passivation layer 200 is disposed on the base substrate 110. The pixel electrode 300 is on the first passivation layer 200 and may be a patterned pixel electrode 300. The second passivation layer 400 is disposed on the first passivation layer 200 and the pixel electrode 300.

The switching element is disposed on the second passivation layer 400. The switching element includes a gate electrode GE, a gate insulating layer 510, a semiconductor layer CH, a source electrode SE and a drain electrode DE.

The gate electrode GE is disposed on the second passivation layer 400. The gate electrode GE is disposed on a same plane, on a same layer of the display panel and/or in a same layer of the display panel as the gate line GL. The gate electrode GE may be extended from the gate line GL.

In one exemplary embodiment, for example, the gate electrode GE may include one of aluminum (Al), copper (Cu), molybdenum (Mo) and titanium Ti, an alloy thereof or a combination thereof. In one exemplary embodiment, for example, the gate electrode GE may include a transparent conductive material such as an indium tin oxide ("ITO"), an indium zinc oxide ("IZO") and an aluminum doped zinc oxide ("AZO").

The gate insulating layer 510 is disposed on the gate electrode GE. The gate insulating layer 510 insulates the gate line GL from the data line DL. In addition, the gate insulating layer 510 insulates the gate electrode GE from the semiconductor layer CH. The gate insulating layer 510 may be disposed corresponding to the entire planar area of the base substrate 110.

In one exemplary embodiment, for example, the gate insulating layer 510 may include a silicon oxide (SiOx). In another exemplary embodiment, for example, the gate insulating layer 510 may include a silicon nitride (SiNx).

The semiconductor layer CH is disposed on the gate insulating layer 510. The semiconductor layer CH overlaps the gate electrode GE. The semiconductor layer CH functions as a channel layer of the switching element.

The semiconductor layer CH may include an amorphous silicon semiconductor. The semiconductor layer CH may include an active layer and an ohmic contact layer. The active layer may include the amorphous silicon. The ohmic contact layer may include an amorphous silicon doped with a dopant. Alternatively, the semiconductor layer CH may include an oxide semiconductor.

The source electrode SE and the drain electrode DE are disposed on the semiconductor layer CH. The source electrode SE and the drain electrode DE are disposed on a same plane, on a same layer of the display panel and/or in a same layer of the display panel as the data line DL. The source electrode SE may be extended from and continuous with the data line DL. The source electrode SE overlaps the semiconductor layer CH. The drain electrode DE overlaps the semiconductor layer CH. The drain electrode DE is spaced apart from the source electrode SE.

In one exemplary embodiment, for example, each of the source electrode SE and the drain electrode DE may include aluminum (Al), copper (Cu), molybdenum (Mo), titanium (Ti) and so on, or an alloy thereof. Each of the source electrode SE and the drain electrode DE may include a transparent conductive material such as an indium tin oxide (ITO), an indium zinc oxide (IZO) and an aluminum doped zinc oxide (AZO).

A contact hole CNT is extended through thicknesses of the second passivation layer 400 and the gate insulating layer 510. The pixel electrode 300 is exposed through the contact hole CNT. The drain electrode DE is electrically connected to the pixel electrode 300 through the contact hole CNT.

The third passivation layer 520 is disposed on the source electrode SE, the drain electrode DE and the semiconductor layer CH. The third passivation layer 520 is disposed on the gate insulating layer 510 in an area where the switching element is not formed. The third passivation layer 520 may be disposed corresponding to the entire planar area of the base substrate 110.

The light blocking pattern BM may be disposed on an area where the switching element is formed. The planarizing layer 600 may be disposed on the light blocking pattern BM. The first polarizing plate 700 may be disposed under the base substrate 110. The second polarizing plate 800 may be disposed on the planarizing layer 600.

According to one or more exemplary embodiment, the display panel includes a single base substrate 110 so that a manufacturing cost may decrease and a thickness of the display panel may decrease. In addition, the liquid crystal layer 140 is sealed within the trench TR of the base substrate 110 so that a durability of the display panel may be dramatically improved.

FIGS. 6A to 6L are cross-sectional views illustrating an exemplary embodiment of a method of manufacturing the display panel of FIG. 1.

Figure 6A:
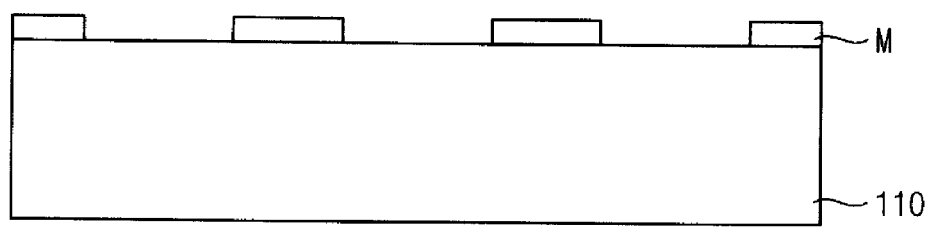
FIGS. 6A to 6L are cross-sectional views illustrating an exemplary embodiment of a method of manufacturing the display panel of FIG. 1.

Referring to FIG. 6A, a trench mask M having a shape corresponding to the pattern of the trench TR is disposed on the base substrate 110. In one exemplary embodiment, for example, the trench mask M may include a photo resist material. In another exemplary embodiment, the trench mask M may be a metal hard mask.

Figure 6B:
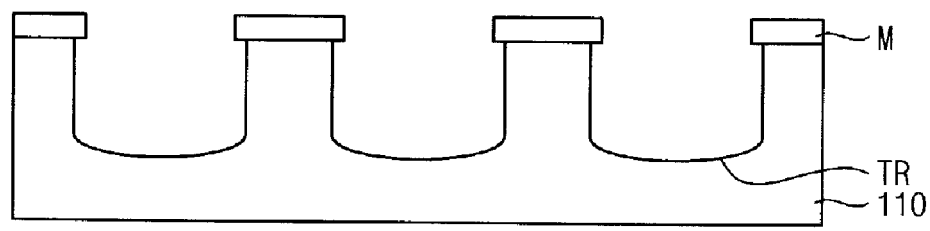

Referring to FIG. 6B, the base substrate 110 on which the trench mask M is disposed is etched. A portion of the base substrate 110 not covered by the trench mask M is etched so that the trench TR is formed. Hydrogen fluoride (HF) may be used to etch the base substrate 110. In the etching process, a portion of the base substrate 110 which is covered by the trench mask M may be partially etched due to a side skew.

A depth of the trench TR defines a cell gap of the display panel. The depth may be taken from an upper surface of the base substrate 110 (e.g., at the opening of the opening of the trench TR) to the bottom surface of the trench TR.

Figure 6C:
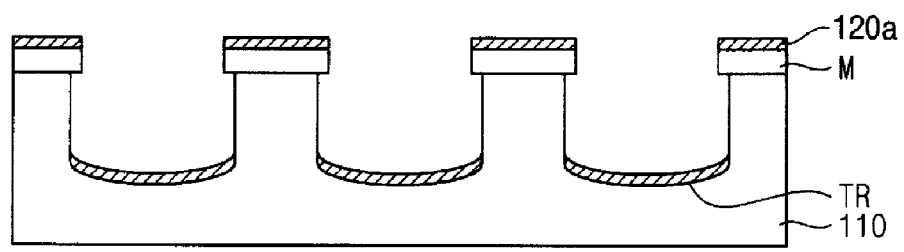

Referring to FIG. 6C, a common electrode material 120*a* is deposited on the base substrate 110 without removing the trench mask M. The common electrode material 120*a* is deposited corresponding to an entire planar area of the base substrate 110, such as in the plan view. The common electrode material 120*a* is deposited on the trench mask M and on the bottom surface of the trench TR.

Figure 6D:
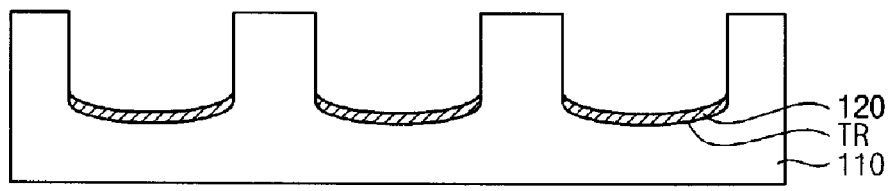

Referring to FIG. 6D, the trench mask M, and the common electrode material 120*a* deposited on the trench mask M are removed. The common electrode material 120*a* on the bottom surface of the trench TR remains so that the common electrode 120 is formed in the trench TR and on the bottom surface of the trench TR. Thus, the common electrode 120 is patterned without an additional mask. Due to the side skew in the etching process, the trench mask M and the common electrode material 120*a* deposited on the trench mask M may be easily removed.

In one exemplary embodiment, for example, the trench mask M, and the common electrode material deposited on the trench mask M, may be removed by a wet strip process which uses a strip solution. Alternatively, the trench mask M, and the common electrode material 120*a* deposited on the trench mask M, may be removed by a scrub process.

Unlike the exemplary embodiment explained referring to FIGS. 6C and 6D, the common electrode 120 may be formed using a common electrode mask having a shape corresponding to a pattern of the common electrode 120.

Referring to FIGS. 4 and 6D, the hole light blocking pattern BMH may be formed on the common electrode 120 corresponding to a position of the injection hole H. As explained above, the hole light blocking pattern BMH may alternatively be formed on the base substrate 110 before forming the common electrode 120.

Figure 6E:
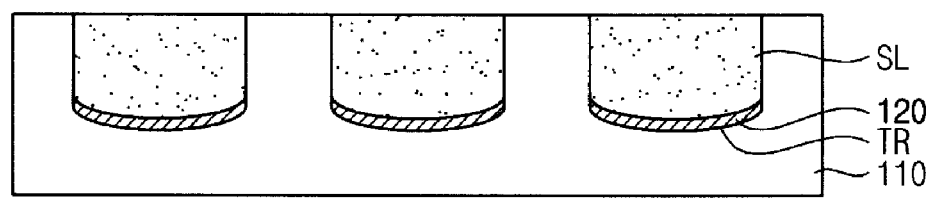
Figure 6F:
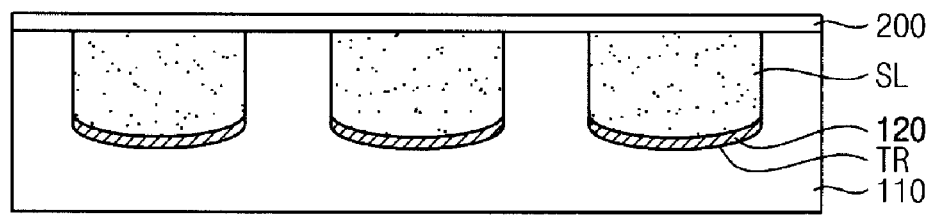

Referring to FIG. 6E, a sacrifice layer SL is formed in the trench TR including the common electrode 120 therein. The sacrifice layer SL may include a photo resist material. The sacrifice layer SL may be initially deposited at a thickness which is greater than the depth of the trench TR, such that a portion of the initial sacrifice layer SL protrudes from the opening of the trench TR, and then the sacrifice layer SL may be ashed to form the sacrifice layer SL in the trench TR. Alternatively, the sacrifice layer SL may be initially deposited at a thickness which is greater than the depth of the trench TR and then the sacrifice layer SL may be polished to form the sacrifice layer SL in the trench TR Referring to FIG. 6F, the first passivation layer 200 is formed on the base substrate 110 and the sacrifice layer SL. The first passivation layer 200 may be deposited on the base substrate 110 and the sacrifice layer SL. The first passivation layer 200 may be deposited corresponding to the entire area of the base substrate 110. The first passivation layer 200 may be deposited at a relatively low temperature to reduce or effectively prevent changes in characteristics of the sacrifice layer SL.

Figure 6G:
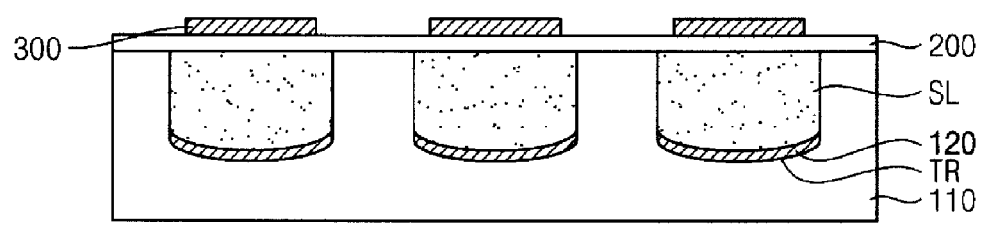

Referring to FIG. 6G, the pixel electrode 300 is formed on the first passivation layer 200. The pixel electrode 300 may be patterned using a pixel electrode mask having a shape correspond to pattern of the pixel electrode 300.

Figure 6H:
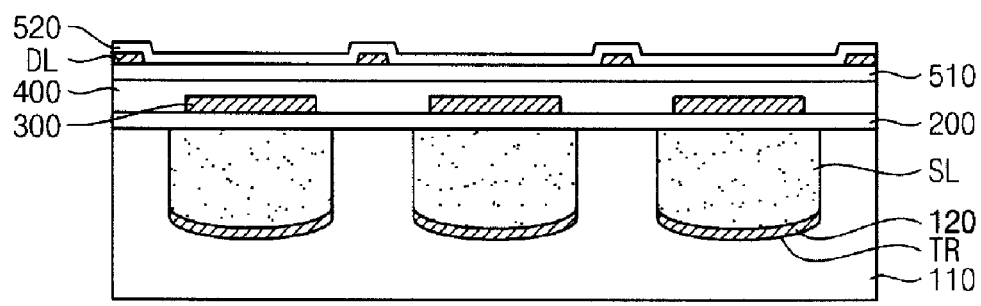

Referring to FIG. 6H, the second passivation layer 400 is formed on the first passivation layer 200 and the pixel electrode 300. The second passivation layer 400 may be deposited on the first passivation layer 200 and the pixel electrode 300. The second passivation layer 400 may be deposited corresponding to the entire area of the base substrate 110.

Referring to FIGS. 5 and 6H, the gate line GL, the data line DL and the switching element are formed on the second passivation layer 400.

The gate line GL and the gate electrode GE are formed on the second passivation layer 400. The gate line GL and the gate electrode GE may be patterned on the second passivation layer 400 using a gate mask having a shape corresponding to the pattern of the gate line GL and the pattern of the gate electrode GE.

The gate insulating layer 510 is formed on the gate line GL and the gate electrode GE. The gate insulating layer 510 may be deposited on the gate line GL and the gate electrode GE. The gate insulating layer 510 may be deposited corresponding to the entire area of the base substrate 110.

The semiconductor layer CH is formed on the gate insulating layer 510. The semiconductor layer CH may be patterned using a semiconductor layer mask having a shape corresponding to the pattern of the semiconductor layer CH.

The contact hole CNT for connecting the drain electrode DE to the pixel electrode 300 is formed to extend through thicknesses of the second passivation layer 400 and the gate insulating layer 510. The contact hole CNT may be patterned using a contact hole mask having a shape corresponding to the pattern of the contact hole CNT.

The data line DL, the source electrode SE and the drain electrode DE are formed on the semiconductor layer CH. The data line DL, the source electrode SE and the drain electrode DE are formed using a data mask having a shape corresponding to the pattern of the data line DL, the source electrode SE and the drain electrode DE. The drain electrode DE is electrically connected to the pixel electrode 300 through the contact hole CNT.

The third passivation layer 520 is formed on the source electrode SE, the drain electrode DE and the semiconductor layer CH. The third passivation layer 520 may be deposited on the source electrode SE, the drain electrode DE and the semiconductor layer CH. The third passivation layer 520 may be deposited corresponding to the entire area of the base substrate 110.

Figure 6I:
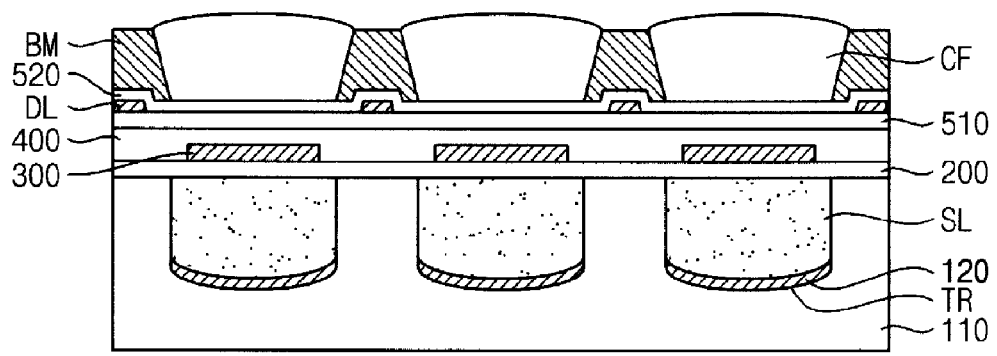

Referring to FIG. 6I, the color filter CF and the light blocking pattern BM are formed on the third passivation layer 520. The color filter CF defines the display area of the display panel and/or the pixels of the display panel. The light blocking pattern BM defines the peripheral area of the display panel and/or the pixels of the display panel.

In one exemplary embodiment, for example, after forming the light blocking pattern BM, the color filter CF may be formed in an area where the light blocking pattern BM is not formed. Alternatively, after forming the color filter CF, the light blocking pattern BM may be formed in an area where the light color filter CF is not formed. The color filter CF and the light blocking pattern BM may partially overlap each other, such as in the plan view.

The light blocking pattern BM may not be formed in a location corresponding to the injection hole H.

Figure 6J:
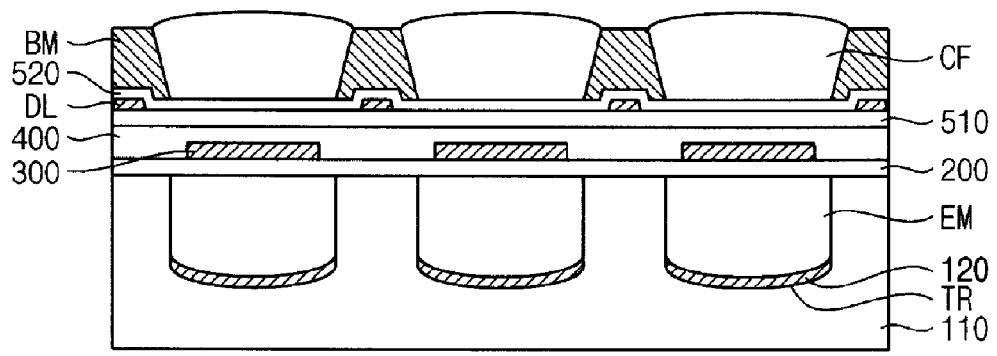

Referring to FIGS. 3, 4 and 6J, the injection hole H is formed to remove the sacrifice layer SL in the trench TR. Portions of the light blocking pattern BM, the third passivation layer 520, the gate insulating layer 510, the second passivation layer 400, the pixel electrode 300 and the first passivation layer 200 may be sequentially and/or simultaneously removed to form the injection hole H. The injection hole H may be patterned using an injection hole mask having a shape corresponding to the pattern of the injection hole H.

Alternatively, the light blocking pattern BM may be formed to have an opening portion corresponding to the injection hole H. When the light blocking pattern BM has the opening portion corresponding to the injection hole H, portions of the third passivation layer 520, the gate insulating layer 510, the second passivation layer 400, the pixel electrode 300 and the first passivation layer 200 may be sequentially removed, such as by using the opening portion of the light blocking pattern BM, to form the injection hole H.

The sacrifice layer SL is removed through the injection hole H. When the sacrifice layer SL includes a photo resist material, the sacrifice layer SL may be removed by the wet strip process. Alternatively, the sacrifice layer SL may be removed by the ashing process. An empty space is formed by removing the sacrifice layer SL, and defines an embedded microcavity EM.

In an exemplary embodiment, the injection hole H may be formed in one of the previous patterning processes. In one exemplary embodiment, for example, the injection hole H may be patterned in the patterning process forming the pixel electrode 300. In one exemplary embodiment, for example, the injection hole H may be patterned in the patterning process forming the gate electrode GE. In one exemplary embodiment, for example, the injection hole H may be patterned in the patterning process forming the semiconductor layer CH. In one exemplary embodiment, for example, the injection hole H may be patterned in the patterning process forming the contact hole CNT. In one exemplary embodiment, for example, the injection hole H may be patterned in the patterning process forming the source electrode SE and the drain electrode DE. In one exemplary embodiment, for example, the injection hole H may be patterned in the patterning process forming the light blocking pattern BM. In one exemplary embodiment, for example, the injection hole H may be patterned in the patterning process forming the color filter CF.

If the injection hole H is formed in one of the previous patterning processes, the injection hole H may be blocked by other layers formed after forming the injection hole H. When the injection hole H is blocked by other layers from previous patterning processes, the injection hole H may be formed again before removing the sacrifice layer SL.

Figure 6K:
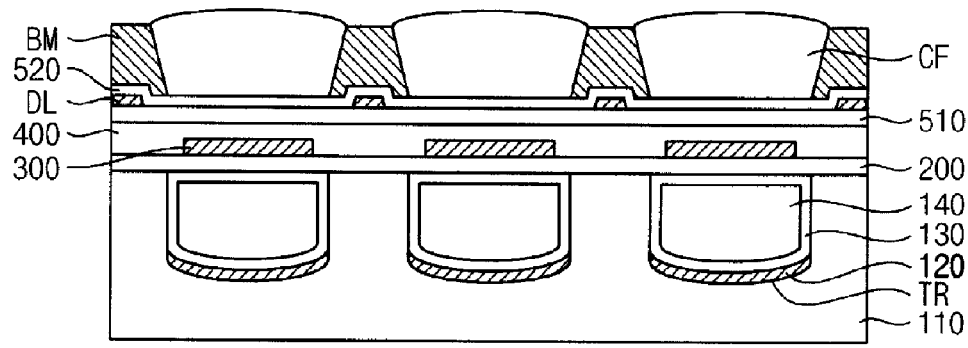

Referring to FIG. 6K, the alignment layer 130 is formed in the embedded microcavity EM. An alignment solution may be injected into the embedded microcavity EM through the injection hole H. In one exemplary embodiment, for example, the alignment solution may be injected by an inkjet printing process. The alignment solution is dried so that the alignment layer 130 is formed on an upper surface of the common electrode 120 and inner walls of the embedded microcavity EM.

The liquid crystal layer 140 is injected into the embedded microcavity EM. The liquid crystal layer 140 may be injected into the embedded microcavity EM through the injection hole H. In one exemplary embodiment, for example, the liquid crystal layer 140 may be injected by an inkjet printing process.

The injection hole H is sealed using a sealant S (see FIG. 4) after the liquid crystal layer 140 is injected into the embedded microcavity EM.

Figure 6L:
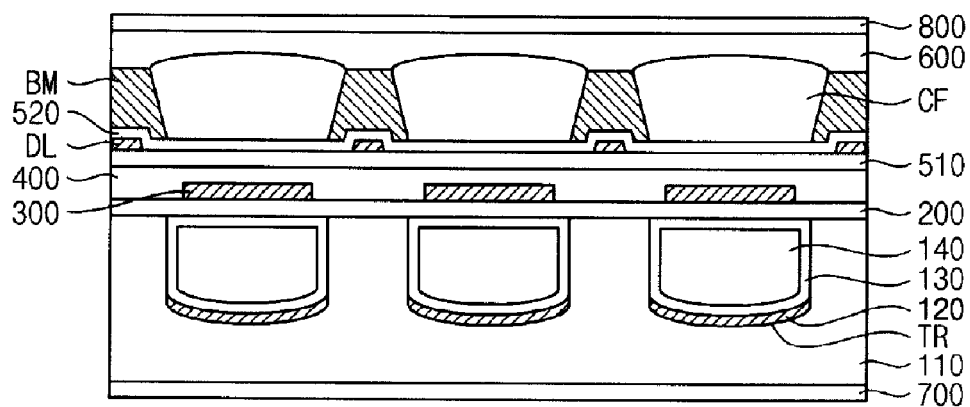

Referring to FIG. 6L, the planarizing layer 600 may be formed on the color filter CF and the light blocking pattern BM. The first polarizing plate 700 may be formed under the base substrate 110. The second polarizing plate 800 may be formed on the planarizing layer 600.

According to one or more exemplary embodiment, the display panel includes a single base substrate 110 so that a manufacturing cost may decrease and a thickness of the display panel may decrease.

In addition, the liquid crystal layer 140 is formed in the trench TR and is completed sealed within the trench TR of the base substrate 110 so that a durability of the display panel may be dramatically improved.

FIGS. 7A to 7K are cross-sectional views illustrating another exemplary embodiment of a method of manufacturing a display panel according to the invention.

The exemplary embodiment of the display panel in FIGS. 7A to 7K is substantially the same as the display panel in FIGS. 1 to 5. Thus, the same reference numerals will be used to refer to the same or like parts as those described in FIGS. 1 to 5 and any repetitive explanation concerning the above elements will be omitted.

The exemplary embodiment of the method of manufacturing the display panel in FIGS. 7A to 7K is substantially the same as the method of manufacturing the display panel in FIGS. 6A to 6L except that the injection hole H is patterned when the pixel electrode 300 is patterned. Thus, the same reference numerals will be used to refer to the same or like parts as those described in FIGS. 6A to 6L and any repetitive explanation concerning the above elements will be omitted.

Figure 7A:
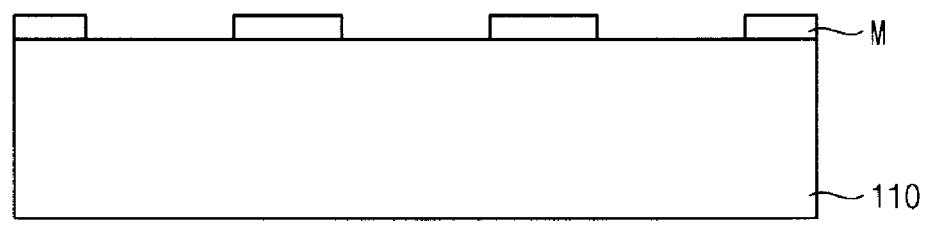
FIGS. 7A to 7K are cross-sectional views illustrating another exemplary embodiment of a method of manufacturing a display panel according to the invention.

Referring to FIG. 7A, a trench mask M having a shape corresponding to the pattern of the trench TR is disposed on the base substrate 110.

Figure 7B:
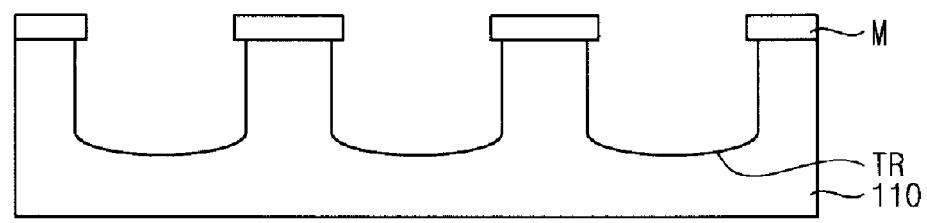

Referring to FIG. 7B, the base substrate 110 on which the trench mask M is disposed is etched.

Figure 7C:
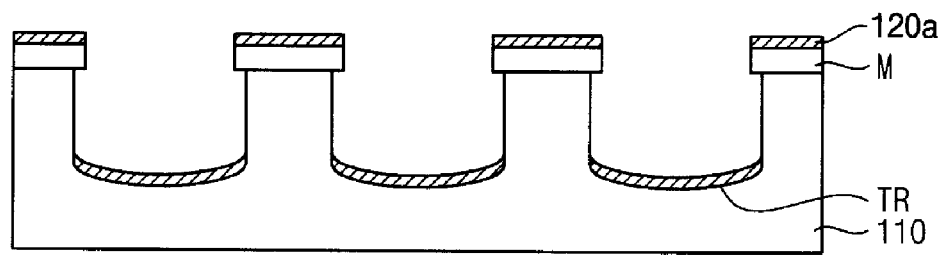

Referring to FIG. 7C, the common electrode material 120a is deposited on the base substrate 110 without removing the trench mask M.

Figure 7D:
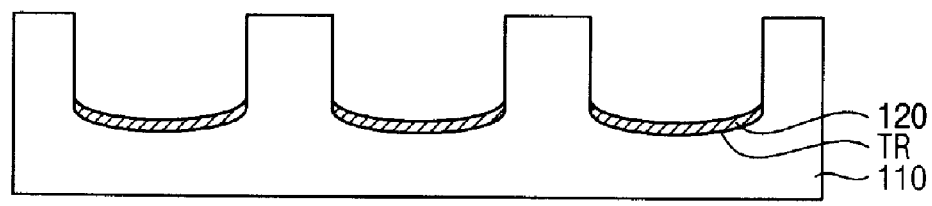

Referring to FIG. 7D, the trench mask M, and the common electrode material 120a deposited on the trench mask M are removed. The common electrode material 120a on the bottom surface of the trench TR remains. Thus, the common electrode 120 is patterned without an additional mask.

Referring to FIGS. 4 and 7D, the hole light blocking pattern BMH may be formed on the common electrode 120 corresponding to a position of the injection hole H.

Figure 7E:
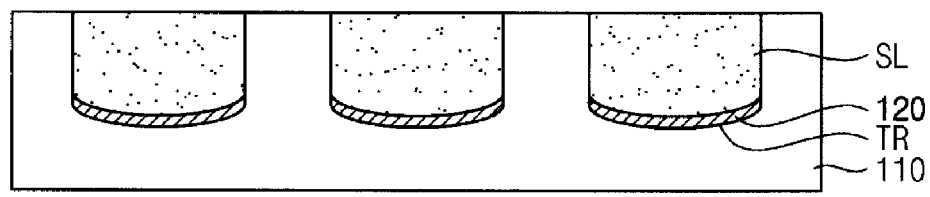

Referring to FIG. 7E, a sacrifice layer SL is formed in the trench TR including the common electrode 120 therein. The sacrifice layer SL may include a photo resist material.

Figure 7F:
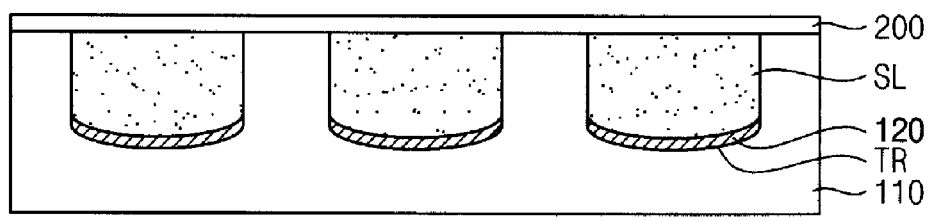

Referring to FIG. 7F, the first passivation layer 200 is formed on the base substrate 110 and the sacrifice layer SL.

Figure 7G:
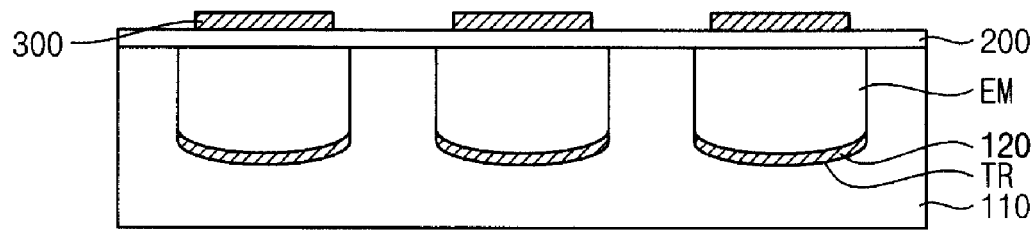

Referring to FIGS. 3, 4 and 7G, the pixel electrode 300 is formed on the first passivation layer 200. The pixel electrode 300 may be patterned using a pixel electrode mask having a shape correspond to the pattern of the pixel electrode 300.

When the pixel electrode 300 is patterned, the injection hole H is formed using the pixel electrode mask. The previously formed first passivation layer 200 may be etched to form the injection hole H.

The sacrifice layer SL is removed through the injection hole H. When the sacrifice layer SL includes a photo resist material, the sacrifice layer SL may be removed by the wet strip process. Alternatively, the sacrifice layer SL may be removed by the ashing process. An empty space is formed by removing the sacrifice layer SL, and defines an embedded microcavity EM.

Unlike the exemplary embodiment explained referring to FIGS. 3, 4 and 7G, the injection hole H may be formed using a gate mask when the gate electrode GE is patterned. The sacrifice layer SL may be removed through the injection hole H.

Figure 7H:
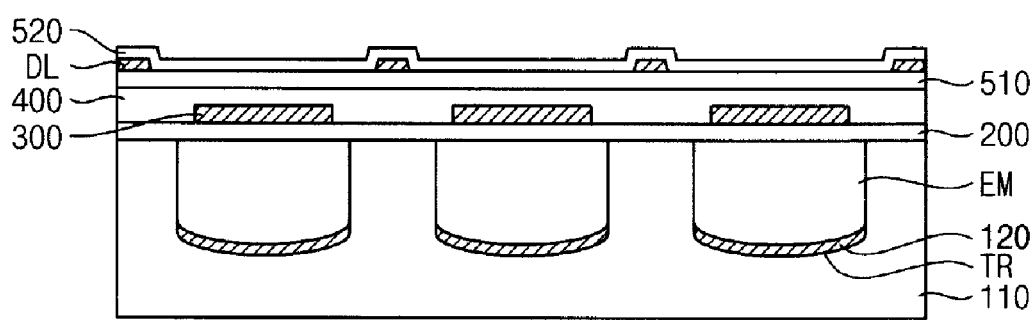

Referring to FIGS. 5 and 7H, the second passivation layer 400 is formed on the first passivation layer 200 and the pixel electrode 300. The gate line GL, the data line DL and the switching element are formed on the second passivation layer 400. The gate insulating layer 510 is formed on the gate line GL and the gate electrode GE. The semiconductor layer CH is formed on the gate insulating layer 510. The contact hole CNT for connecting the drain electrode DE to the pixel electrode 300 is formed to extend through thicknesses of the second passivation layer 400 and the gate insulating layer 510. The data line DL, the source electrode SE and the drain electrode DE are formed on the semiconductor layer CH. The third passivation layer 520 is formed on the source electrode SE, the drain electrode DE and the semiconductor layer CH.

Figure 7I:
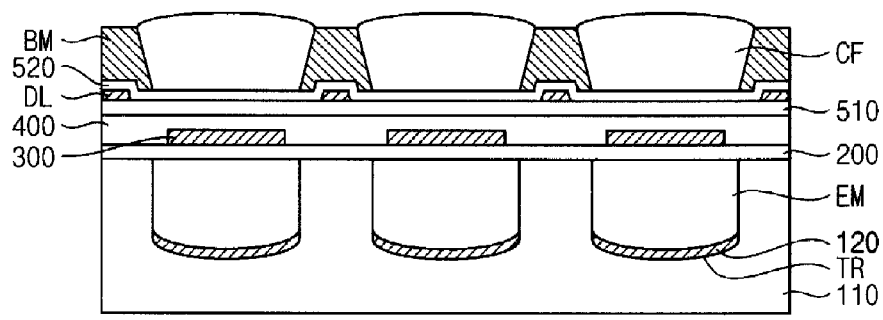

Referring to FIG. 7I, the color filter CF and the light blocking pattern BM are formed on the third passivation layer 520.

Figure 7J:
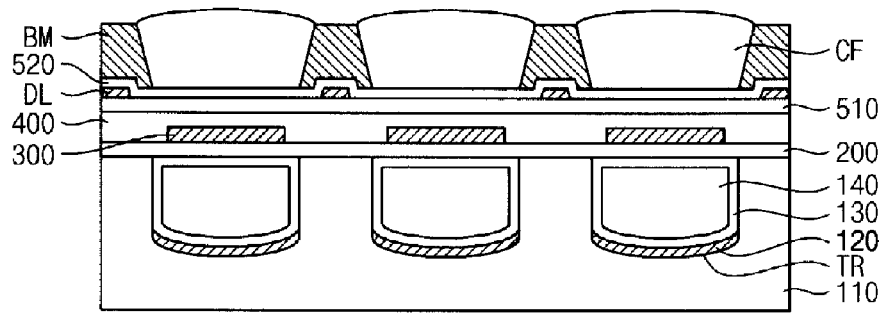

Referring to FIG. 7J, the alignment layer 130 is formed in the embedded microcavity EM. An alignment solution may be injected into the embedded microcavity EM through the injection hole H.

The liquid crystal layer 140 is injected into the embedded microcavity EM. The liquid crystal layer 140 may be injected into the embedded microcavity EM through the injection hole H.

The injection hole H is sealed using a sealant S (see FIG. 4) after the liquid crystal layer 140 is injected into the embedded microcavity EM.

Figure 7K:
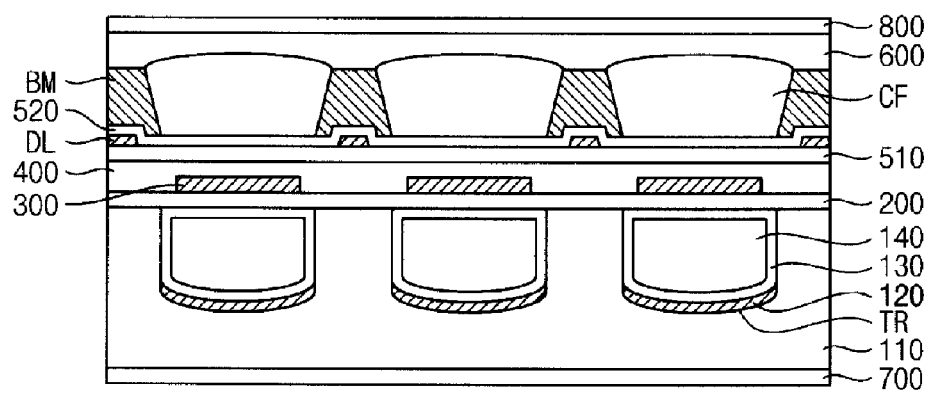

Referring to FIG. 7K, the planarizing layer 600 may be formed on the color filter CF and the light blocking pattern BM. The first polarizing plate 700 may be formed under the base substrate 110. The second polarizing plate 800 may be formed on the planarizing layer 600.

According to one or more exemplary embodiment, the display panel includes a single base substrate 110 so that a manufacturing cost may decrease and a thickness of the display panel may decrease.

In addition, the liquid crystal layer 140 is formed in and is completed sealed within the trench TR of the base substrate 110 so that a durability of the display panel may be dramatically improved.

In addition, the sacrifice layer SL is removed before forming the semiconductor layer CH so that the semiconductor layer CH may be formed in a relatively high temperature without considering a change of the characteristics of the sacrifice layer SL. The sacrifice layer SL is removed before forming the color filter CF so that the color filter CF may be formed in a relatively high temperature without considering a change of the characteristics of the sacrifice layer SL. Thus, a reliability and a display quality of the display panel may be improved.

Figure 8:
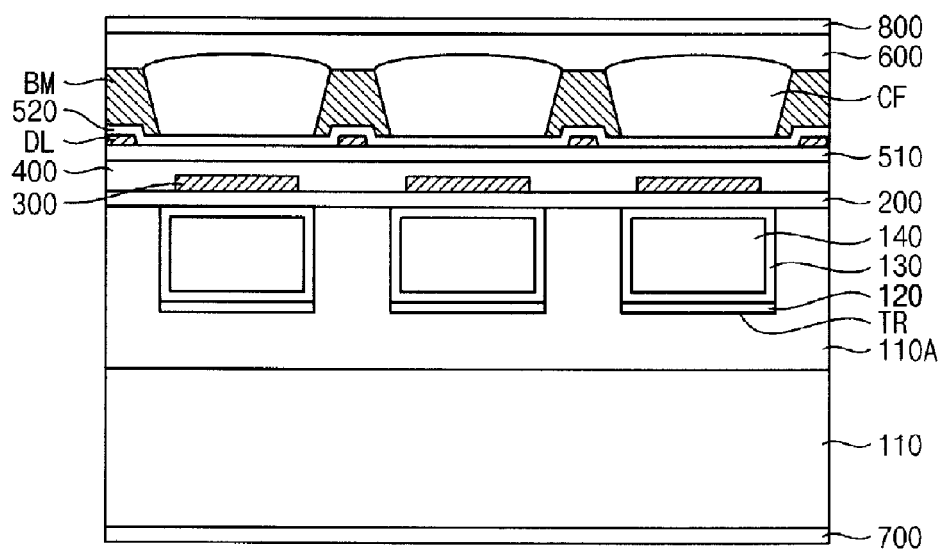
FIG. 8 is a cross-sectional view illustrating another exemplary embodiment of a display panel according to the invention.

FIG. 8 is a cross-sectional view illustrating another exemplary embodiment of a display panel according to the invention.

The exemplary embodiment of the display panel and the method of manufacturing the display panel in FIG. 8 is substantially the same as the display panel and the method of manufacturing the display panel in FIGS. 1 to 5 and 6A to 6L except that the trench TR is formed in a protecting layer 110A instead of the base substrate 110. Thus, the same reference numerals will be used to refer to the same or like parts as those described in FIGS. 1 to 5 and 6A to 6L and any repetitive explanation concerning the above elements will be omitted.

Referring to FIGS. 1 and 8, the display panel includes a base substrate 110, a protecting layer 110A, a common electrode 120, a liquid crystal layer 140, a first passivation layer 200, a pixel electrode 300, a second passivation layer 400, a gate line GL, a data line DL, a switching element, a third passivation layer 520, a color filter CF and a light blocking pattern BM. A collective base substrate member may include the base substrate 110 and the protecting layer 110A.

The display panel may further include an alignment layer 130 which aligns the liquid crystal layer 140. The display panel may further include a planarizing layer 600 which planarizes the color filter CF and the light blocking pattern BM. The display panel may further include a first polarizing plate 700 disposed under the base substrate 110 and a second polarizing plate 800 disposed on the planarizing layer 600.

The base substrate 110 includes a glass. The base substrate 110 may include a flexible material.

The protecting layer 110A is disposed on the base substrate 110. The protecting layer 110A may be directly on the base substrate 110, but the invention is not limited thereto or thereby. The protecting layer 110A may include an organic material. Alternatively, the protecting layer 110A may include an inorganic material. A trench TR is in the protecting layer 110A.

The common electrode 120 is disposed in the trench TR and on a bottom portion of the trench TR. A common voltage is applied to the common electrode 120.

The alignment layer 130 may be disposed on an upper surface of the common electrode 120 and on inner walls of the trench TR.

The liquid crystal layer 140 is in the trench TR. The trench TR is filled with the liquid crystal layer 140, such as completely filling the opened area defined by the alignment layer 130. In one exemplary embodiment, the liquid crystal layer 140 may be injected into the trench TR through the injection hole.

The first passivation layer 200 is disposed on the protecting layer 110A and on the liquid crystal layer 140.

The pixel electrode 300 is disposed on the first passivation layer 200.

The second passivation layer 400 is disposed on the first passivation layer 200 and the pixel electrode 300.

The gate line GL, the data line DL and the switching element are disposed on the second passivation layer 400.

The third passivation layer 520 is disposed on the gate line GL, the data line DL and the switching element.

The color filter CF and the light blocking pattern BM are disposed on the third passivation layer 520.

The planarizing layer 600 may be disposed on the color filter CF and the light blocking pattern BM. The first polarizing plate 700 may be disposed under the base substrate 110. The second polarizing plate 800 may be disposed on the planarizing layer 600.

According to one or more exemplary embodiment, the display panel includes a single base substrate 110 so that a manufacturing cost may decrease and a thickness of the display panel may decrease. In addition, the liquid crystal layer 140 is sealed within the trench TR of the base substrate 110 so that a durability of the display panel may be dramatically improved.

FIGS. 9A to 9K are cross-sectional views illustrating an exemplary embodiment of a method of manufacturing the display panel of FIG. 8.

Figure 9A:
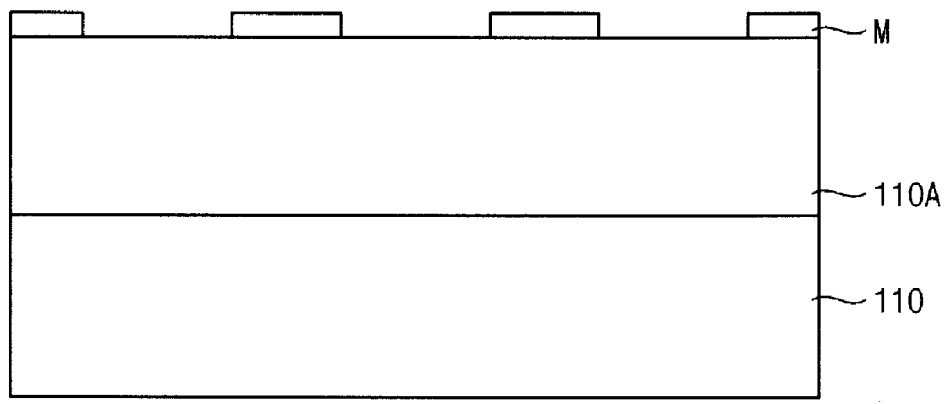
FIGS. 9A to 9K are cross-sectional views illustrating an exemplary embodiment of a method of manufacturing the display panel of FIG. 8.

Referring to FIG. 9A, the protecting layer 110A is formed on the base substrate 110. A trench mask M having a shape corresponding to the pattern of the trench TR is disposed on the protecting layer 110A.

Figure 9B:
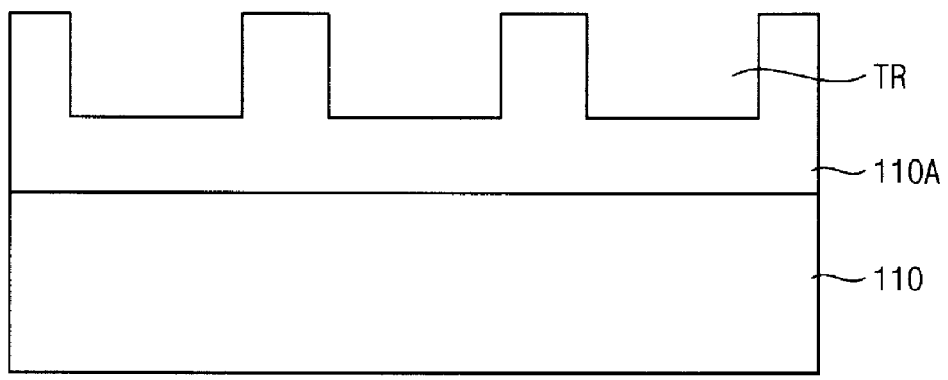

Referring to FIG. 9B, the protecting layer 110A on which the trench mask M is disposed is etched.

Figure 9C:
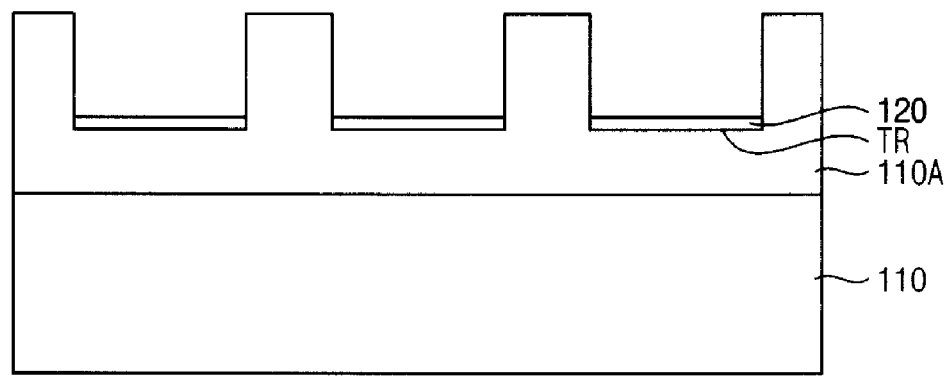

Referring to FIG. 9C, the common electrode 120 is formed in the trench TR and on a bottom surface of the trench TR. The common electrode 120 may be patterned using a common electrode mask having a shape corresponding to the shape of the common electrode 120.

Referring to FIGS. 4 and 9C, the hole light blocking pattern BMH may be formed on the common electrode 120 corresponding to a position of the injection hole H.

Figure 9D:
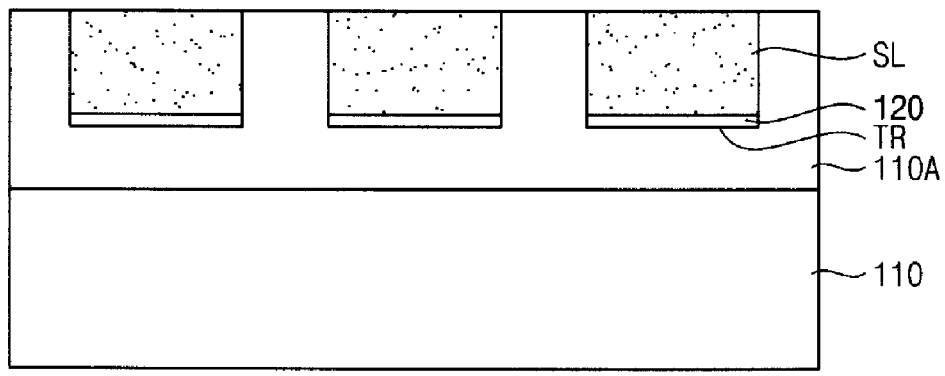

Referring to FIG. 9D, a sacrifice layer SL is formed in the trench TR including the common electrode 120.

Figure 9E:
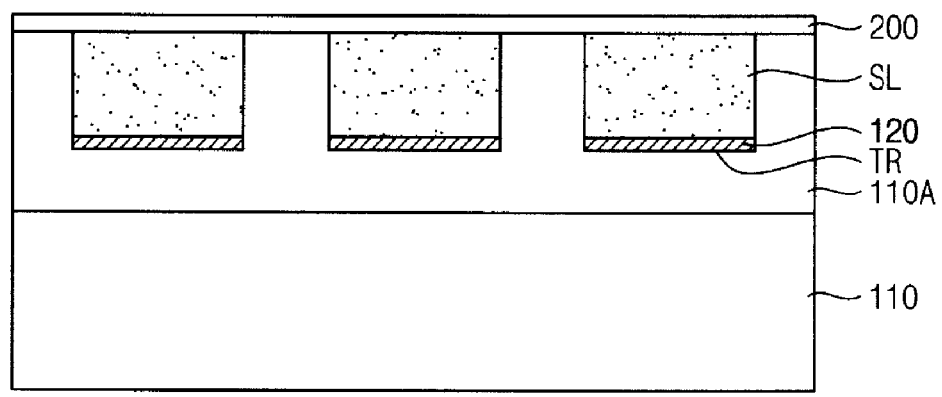

Referring to FIG. 9E, the first passivation layer 200 is formed on the protecting layer 110A and the sacrifice layer SL.

Figure 9F:
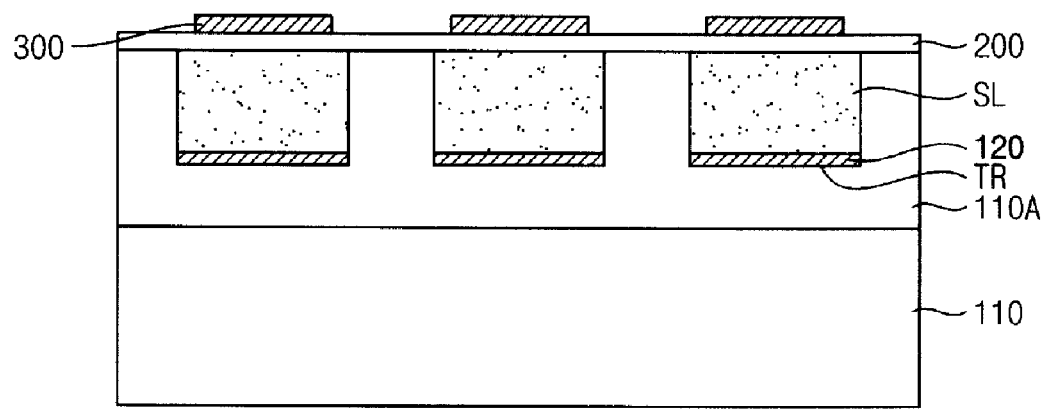

Referring to FIG. 9F, the pixel electrode 300 is formed on the first passivation layer 200.

Figure 9G:
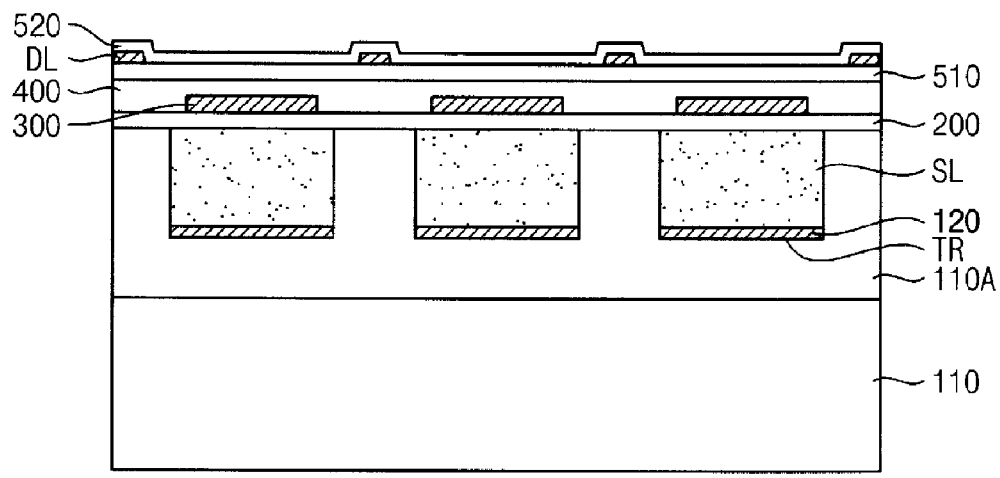

Referring to FIGS. 5 and 9G, the second passivation layer 400 is formed on the first passivation layer 200 and the pixel electrode 300. The gate line GL, the data line DL and the switching element are formed on the second passivation layer 400. The gate insulating layer 510 is formed on the gate line GL and the gate electrode GE. The semiconductor layer CH is formed on the gate insulating layer 510. The contact hole CNT for connecting the drain electrode DE to the pixel electrode 300 is formed to extend through thicknesses of the second passivation layer 400 and the gate insulating layer 510. The data line DL, the source electrode SE and the drain electrode DE are formed on the semiconductor layer CH. The third passivation layer 520 is formed on the source electrode SE, the drain electrode DE and the semiconductor layer CH.

Figure 9H:
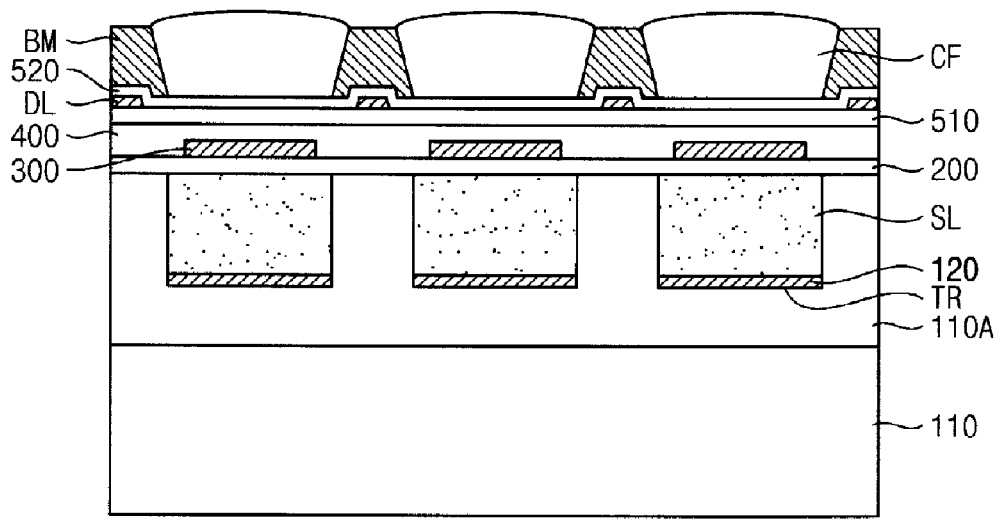

Referring to FIG. 9H, the color filter CF and the light blocking pattern BM are formed on the third passivation layer 520.

Figure 9I:
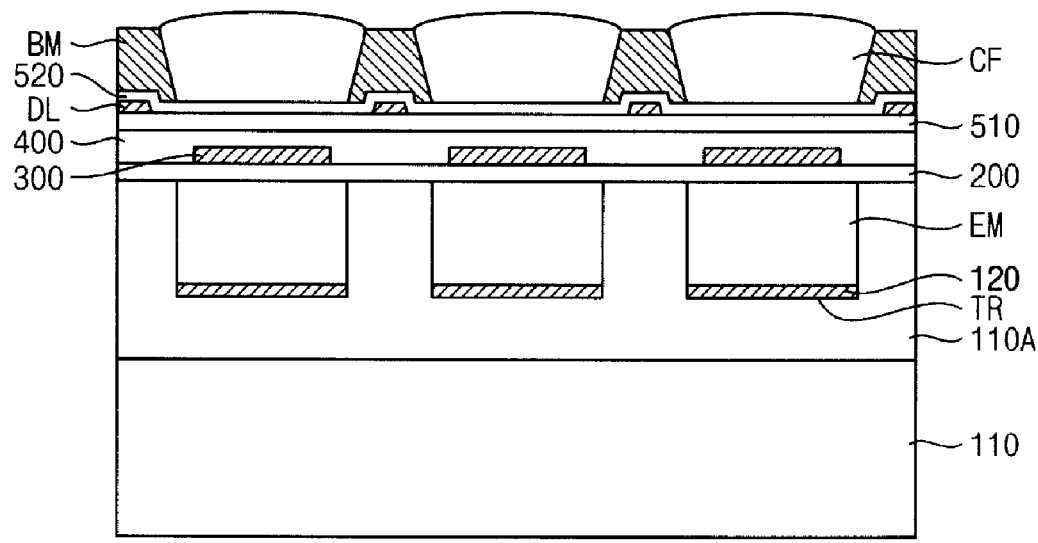

Referring to FIGS. 3, 4 and 9I, the injection hole H is formed to remove the sacrifice layer SL in the trench TR.

The sacrifice layer SL is removed through the injection hole H. When the sacrifice layer SL includes a photo resist material, the sacrifice layer SL may be removed by the wet strip process. Alternatively, the sacrifice layer SL may be removed by the ashing process. An empty space is formed by removing the sacrifice layer SL, and defines an embedded microcavity EM.

In an exemplary embodiment, the injection hole H may be formed in one of the previous patterning processes. As explained referring to FIGS. 7A to 7K, the injection hole H may be patterned in the patterning process of the pixel electrode 300. In one exemplary embodiment, for example, the injection hole H may be patterned in the patterning process of the gate electrode GE. In one exemplary embodiment, for example, the injection hole H may be patterned in the patterning process of the semiconductor layer CH. In one exemplary embodiment, for example, the injection hole H may be patterned in the patterning process of the contact hole CNT. In one exemplary embodiment, for example, the injection hole H may be patterned in the patterning process of the source electrode SE and the drain electrode DE. In one exemplary embodiment, for example, the injection hole H may be patterned in the patterning process of the light blocking pattern BM. In one exemplary embodiment, for example, the injection hole H may be patterned in the patterning process of the color filter CF.

Figure 9J:
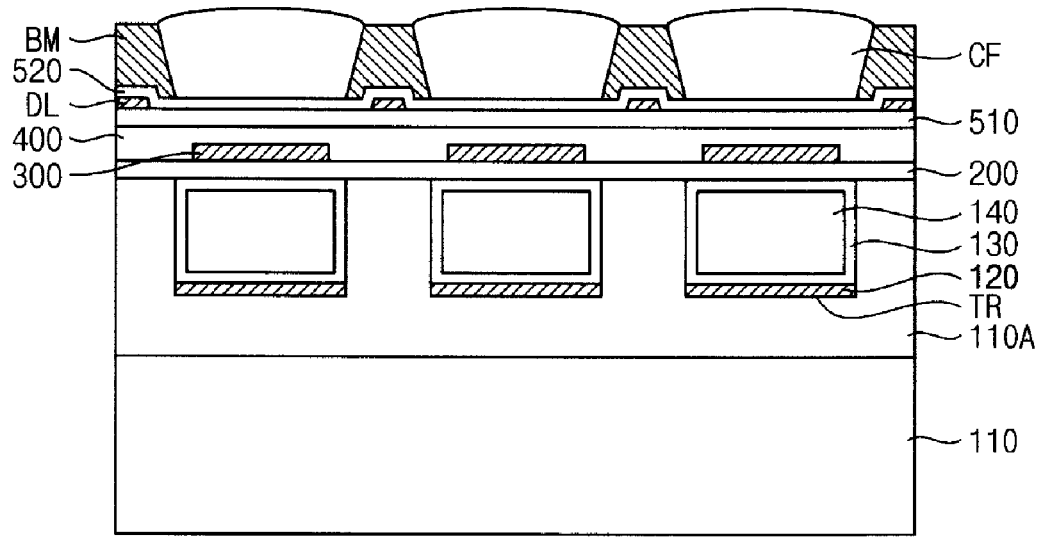

Referring to FIG. 9J, the alignment layer 130 is formed in the embedded microcavity EM. An alignment solution may be injected into the injected into the embedded microcavity EM through the injection hole H.

The liquid crystal layer 140 is injected into the embedded microcavity EM. The liquid crystal layer 140 may be injected into the embedded microcavity EM through the injection hole H.

The injection hole H is sealed using a sealant S (see FIG. 4) after the liquid crystal layer 140 is injected into the embedded microcavity EM.

Figure 9K:
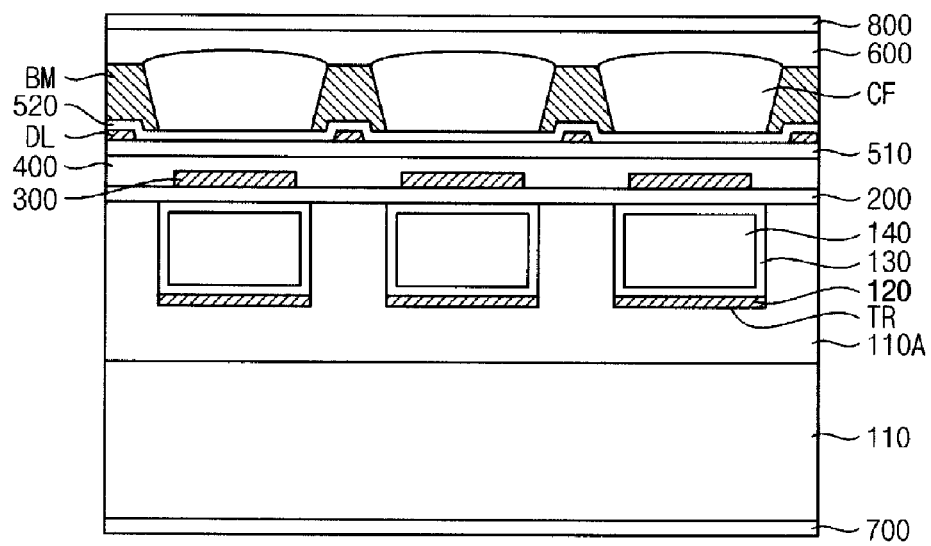

Referring to FIG. 9K, the planarizing layer 600 may be formed on the color filter CF and the light blocking pattern BM. The first polarizing plate 700 may be formed under the base substrate 110. The second polarizing plate 800 may be formed on the planarizing layer 600.

According to one or more exemplary embodiment, the display panel includes a single base substrate 110 so that a manufacturing cost may decrease and a thickness of the display panel may decrease.

In addition, the liquid crystal layer 140 is formed in the trench TR of the protecting layer 110A and is completely sealed within the trench TR of the protecting layer 11A so that a durability of the display panel may be dramatically improved.

According to one or more exemplary embodiment of the invention as explained above, the display panel includes a single base substrate member so that a manufacturing cost may decrease. In addition, the liquid crystal layer is in the trench TR of the base substrate or in the trench of the protecting layer, and sealed within the base substrate or the protecting layer, so that a durability of the display panel may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifies to the disclosed exemplary embodiments, as well as other exemplary embodiments, are intended to be included within the scope of the appended claims. The invention is defined by the following claims, with equivalents of the claims to be included therein.

What is claimed is:

1. A display panel comprising:
    a base substrate comprising a bottom portion which extends to define walls of the base substrate, wherein the bottom portion and the walls of the base substrate define a trench in the base substrate, and
        a distal end of the walls which opposes the bottom portion defines an upper surface of the trench;
    a common electrode in the trench;
    a liquid crystal layer on the common electrode and completely in the trench defined in the base substrate;
    a filter layer in which a color filter and a light blocking pattern are alternated, the filter layer facing the upper surface of the trench in which the liquid crystal layer is disposed on the common electrode;

a pixel electrode disposed between the color filter and the light blocking pattern of the filter layer and the upper surface of the trench;

a first passivation layer between the liquid crystal layer and the pixel electrode;

a thin film transistor array comprising a gate line, a data line and a switching element, the thin film transistor array disposed between the color filter and the light blocking pattern of the filter layer and the pixel electrode; and a second passivation layer disposed between the pixel electrode and the thin film transistor array, wherein the switching element includes a drain electrode that passes through the second passivation layer to be connected to the pixel electrode.

2. The display panel of claim 1, further comprising:

a third passivation layer between the switching element and the light blocking pattern.

3. The display panel of claim 2, wherein the switching element comprises:

a gate electrode on the second passivation layer;

a gate insulating layer on the gate electrode;

a semiconductor layer on the gate insulating layer and overlapping the gate electrode; and a source electrode on the semiconductor layer and overlapping the semiconductor layer.

4. The display panel of claim 3, wherein the second passivation layer and the gate insulating layer include a contact hole, and the drain electrode passes through the contact holes to be connected to the pixel electrode.

5. The display panel of claim 1, further comprising a display area corresponding to the color filter, and a peripheral area corresponding to the light blocking pattern, and an injection hole in the peripheral area, extending from an outside of the trench to an inside of the trench and through the pixel electrode, and through which the liquid crystal layer is provided to the trench.

6. The display panel of claim 5, further comprising a hole light blocking pattern in the trench, in a different layer than the light blocking pattern, and corresponding to the injection hole.

7. The display panel of claim 1, further comprising a planarizing layer on the color filter and the light blocking pattern, wherein the planarizing layer compensates a height difference between the color filter and the light blocking pattern.

8. The display panel of claim 7, further comprising a first polarizing plate under the base substrate and a second polarizing plate on the planarizing layer.

* * * * *